(12) United States Patent
Wu et al.

(10) Patent No.: US 11,372,293 B2
(45) Date of Patent: Jun. 28, 2022

(54) LIQUID CRYSTAL PANEL AND REPAIRING METHOD USING A LASER THEREOF, AND DISPLAY DEVICE

(71) Applicants: HEFEI BOE DISPLAY TECHNOLOGY CO., LTD., Anhui (CN); BOE TECHNOLOGY GROUP CO., LTD., Beijing (CN)

(72) Inventors: Guodong Wu, Beijing (CN); Ping Chen, Beijing (CN); Hewei Wang, Beijing (CN); Song Wu, Beijing (CN); Chen Tang, Beijing (CN); Mingming Mu, Beijing (CN); Junfeng Li, Beijing (CN); Haitao Hu, Beijing (CN); Fugai Chen, Beijing (CN); Shuai Ji, Beijing (CN); Hao Yu, Beijing (CN)

(73) Assignees: HEFEI BOE DISPLAY TECHNOLOGY CO, LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 106 days.

(21) Appl. No.: 16/825,693

(22) Filed: Mar. 20, 2020

(65) Prior Publication Data
US 2021/0055613 A1 Feb. 25, 2021

(30) Foreign Application Priority Data

Aug. 21, 2019 (CN) .......................... 201910772467.0

(51) Int. Cl.
*G02F 1/1362* (2006.01)
*G02F 1/1333* (2006.01)
(Continued)

(52) U.S. Cl.
CPC ...... *G02F 1/136259* (2013.01); *G02F 1/1337* (2013.01); *G02F 1/13439* (2013.01);
(Continued)

(58) Field of Classification Search
CPC ......... G02F 1/136259; G02F 1/136263; G02F 1/136268
See application file for complete search history.

(56) References Cited

U.S. PATENT DOCUMENTS

2006/0285068 A1* 12/2006 Kawada ................ G02F 1/1303
349/192
2017/0271379 A1 9/2017 Murakami
(Continued)

FOREIGN PATENT DOCUMENTS

CN 102654661 A 9/2012
CN 102650750 B 6/2014
(Continued)

*Primary Examiner* — Paul C Lee
(74) *Attorney, Agent, or Firm* — The Webb Law Firm

(57) ABSTRACT

The present disclosure relates to a liquid crystal panel and a repairing method thereof, and a display device. The liquid crystal panel includes an array substrate and a filter substrate, and the repairing method includes: irradiating a pixel which is a bright spot of the liquid crystal panel with laser from one side of the array substrate away from the filter substrate, so that a portion of the array substrate located in the pixel is converted from a light transmitting area into a light shielding area.

13 Claims, 5 Drawing Sheets

(51) Int. Cl.
*G02F 1/1337* (2006.01)
*G02F 1/1343* (2006.01)

(52) U.S. Cl.
CPC .. *G02F 1/133345* (2013.01); *G02F 1/136209* (2013.01); *G02F 1/136286* (2013.01); *G02F 1/136263* (2021.01); *G02F 2201/121* (2013.01); *G02F 2201/123* (2013.01)

(56) References Cited

U.S. PATENT DOCUMENTS

| | | | |
|---|---|---|---|
| 2019/0027549 A1 | | 1/2019 | Ai et al. |
| 2019/0079322 A1 | | 3/2019 | Feng et al. |
| 2020/0150500 A1 | * | 5/2020 | Cheng ................ G02F 1/13439 |

FOREIGN PATENT DOCUMENTS

| | | | | | |
|---|---|---|---|---|---|
| CN | 102629004 B | | 8/2014 | | |
| CN | 105093747 A | | 11/2015 | | |
| CN | 105336747 A | | 2/2016 | | |
| CN | 107450209 A | | 12/2017 | | |
| CN | 107561769 A | | 1/2018 | | |
| CN | 108258007 A | | 7/2018 | | |
| CN | 110133925 A | * | 8/2019 | ......... | H01L 27/1262 |
| JP | 02254423 A | * | 10/1990 | ....... | G02F 1/136259 |
| JP | 2008152256 A | * | 7/2008 | ....... | G02F 1/136259 |
| JP | 2018159816 A | * | 10/2018 | ....... | G02F 1/133512 |

* cited by examiner

LIQUID CRYSTAL PANEL AND REPAIRING METHOD USING A LASER THEREOF, AND DISPLAY DEVICE

CROSS-REFERENCE TO RELATED APPLICATION

This application claims priority to Chinese Patent Application No. 201910772467.0 filed Aug. 21, 2019, the disclosure of which is hereby incorporated by reference in its entirety.

BACKGROUND OF THE INVENTION

Field of the Invention

The present disclosure relates to a liquid crystal panel and a repairing method thereof, and a display device.

Description of Related Art

Among flat panel display devices, TFT-LCD (Thin Film Transistor Liquid Crystal Display) is widely applied with characteristics such as small thickness, low weight, environment friendliness and high performance.

SUMMARY OF THE INVENTION

According to one aspect of the embodiments of the present disclosure, a repairing method of a liquid crystal panel is provided, wherein the liquid crystal panel comprises an array substrate and a filter substrate, and the repairing method comprises: irradiating a pixel which is a bright spot of the liquid crystal panel with laser from one side of the array substrate away from the filter substrate, so that a portion of the array substrate located in the pixel is converted from a light transmitting area into a light shielding area.

In some embodiments, the array substrate comprises a first substrate and a first transparent electrode located on one side of the first substrate close to the filter substrate; and the irradiating comprises: irradiating a portion of the first transparent electrode located in the pixel with the laser to obtain the light shielding area.

In some embodiments, the array substrate further comprises a second transparent electrode located between the first transparent electrode and the first substrate, and an inorganic insulating layer located between the first transparent electrode and the second transparent electrode; and the irradiating comprises: irradiating the portion of the first transparent electrode located in the pixel, a portion of the inorganic insulating layer located in the pixel and a portion of the second transparent electrode located in the pixel with the laser to obtain the light shielding area comprising a heterogeneous mixture.

In some embodiments, the array substrate further comprises a first alignment layer located on one side of the first transparent electrode away from the first substrate; and the irradiating further comprises: irradiating a portion of the first alignment layer located in the pixel with the laser to carbonize the portion of the first alignment layer.

In some embodiments, the filter substrate comprises a second alignment layer; and the irradiating further comprises: irradiating a portion of the second alignment layer located in the pixel with the laser to carbonize the portion of the second alignment layer.

In some embodiments, the irradiating comprises: irradiating the pixel for a plurality of times with the laser along a first direction, wherein the pixel is irradiated for one of any two of the plurality of times starting from an edge area of the pixel, and the pixel is irradiated for the other of the any two of the plurality of times starting from another edge area of the pixel.

In some embodiments, the pixel is divided into a first area and a second area by a line passing through a geometric center of the pixel and parallel to the first direction; and the plurality of times comprises a first plurality of times for irradiating the first area and a second plurality of times for irradiating the second area, wherein at least one of the first plurality of times or the second plurality of times is irradiated according to a sequence from being away from the line to being close to the line.

In some embodiments, the array substrate comprises a data line and a gate line, and one of the data line and the gate line extends along the first direction and the other extends along a second direction different from the first direction.

In some embodiments, the first transparent electrode is a pixel electrode, and the second transparent electrode is a common electrode.

In some embodiments, the laser has a wavelength of 1030 to 1064 nanometers, a frequency of 125 to 165 kHz, a scanning speed of 265 to 335 microns/second, and an optical spot with a long diameter of 4 to 10 microns and a short diameter of 2.5 to 6 microns.

In some embodiments, the laser has the wavelength of 1030 nanometers, the frequency of 125 kHz, the scanning speed of 280 microns/second, and the optical spot with the long diameter of 4 microns and the short diameter of 2.5 microns.

In some embodiments, the laser has the wavelength of 1030 nanometers, the frequency of 150 kHz, the scanning speed of 300 microns/second, and the optical spot with the long diameter of 6 microns and the short diameter of 4 microns.

In some embodiments, the laser has the wavelength of 1030 nanometers, the frequency of 165 kHz, the scanning speed of 300 microns/second, and the optical spot with the long diameter of 4 microns and the short diameter of 2.5 microns.

In some embodiments, the laser has the wavelength of 1030 nanometers, the frequency of 130 kHz, the scanning speed of 295 microns/second, and the optical spot with the long diameter of 5 microns and the short diameter of 4 microns.

In some embodiments, the repairing method further comprises: repairing the liquid crystal panel by at least one of a light shielding matrix diffusion method or a filter layer carbonization method, before irradiating the pixel with the laser.

According to another aspect of the embodiments of the present disclosure, a liquid crystal panel is provided. The liquid crystal panel comprises an array substrate and a filter substrate, wherein a portion of the array substrate located in at least one pixel of the liquid crystal panel is a light shielding area.

In some embodiments, the array substrate comprises a first substrate and a first transparent electrode located on one side of the first substrate close to the filter substrate; and the light shielding area is obtained by irradiating a portion of the first transparent electrode located in the at least one pixel with laser.

In some embodiments, the array substrate further comprises a second transparent electrode located between the first transparent electrode and the first substrate, and an inorganic insulating layer between the first transparent electrode and the second transparent electrode; and the light shielding area comprises a heterogeneous mixture obtained by irradiating the portion of the first transparent electrode, and a portion of the inorganic insulating layer located in the at least one pixel and a portion of the second transparent electrode located in the at least one pixel with the laser.

In some embodiments, the array substrate further comprises a first alignment layer located on one side of the first transparent electrode away from the first substrate, and the filter substrate comprises a second alignment layer, wherein at least one of a portion of the first alignment layer located in the at least one pixel or a portion of the second alignment layer located in the at least one pixel is carbonized.

According to a further aspect of the embodiments of the present disclosure, a display device is provided. The display device comprises the liquid crystal panel provided by any one of the above embodiments.

Other features and advantages of the present disclosure will become apparent from the following detailed description of the embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1A:
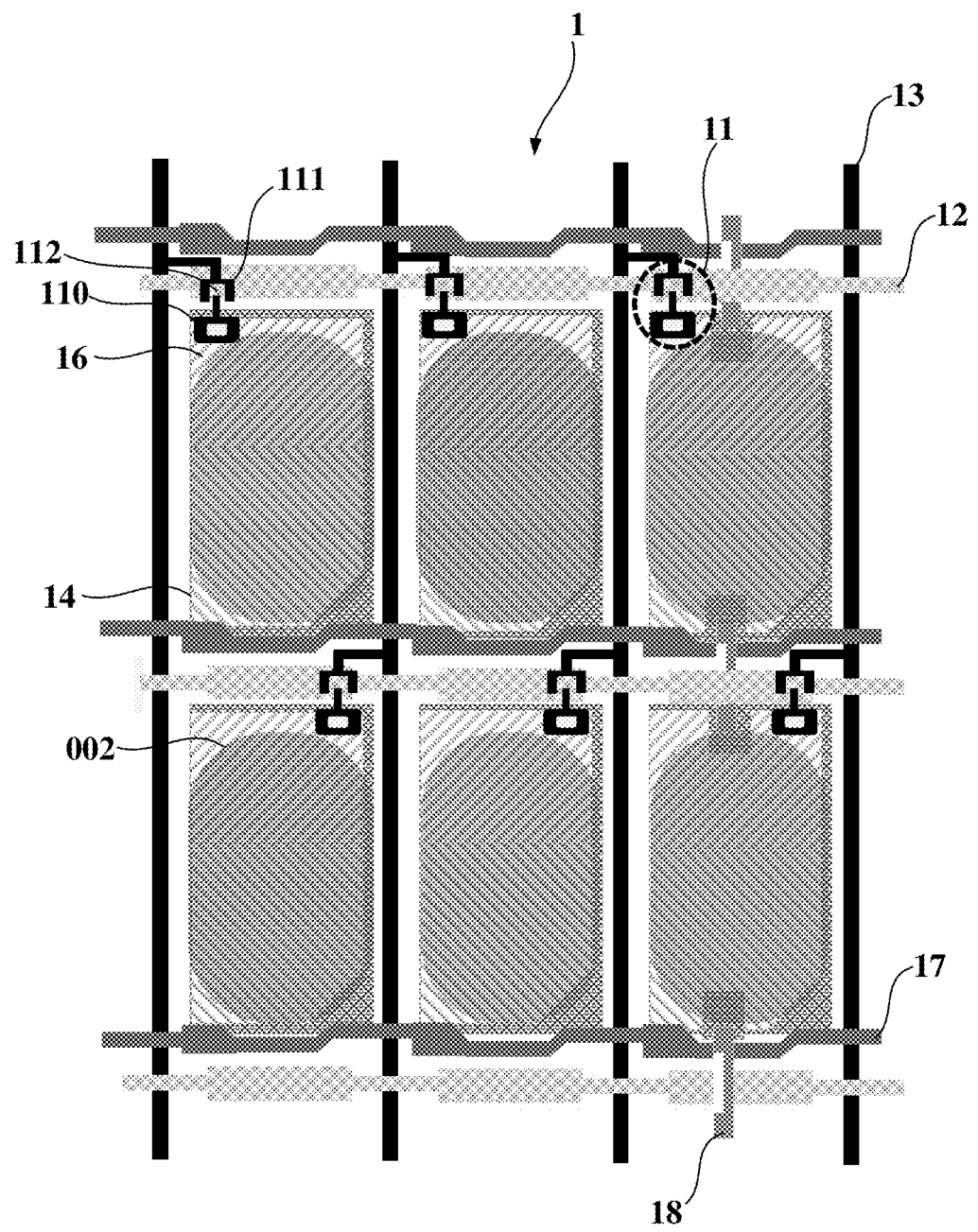
FIG. 1a is a schematic structural view showing partial top view of an array substrate of a liquid crystal panel according to an embodiment of the present disclosure.

It should be understood that the dimensions of the various parts shown in the accompanying drawings are not necessarily drawn according to the actual scale. In addition, the same or similar reference signs are used to denote the same or similar components.

DESCRIPTION OF THE INVENTION

Various embodiments of the present disclosure will now be described in detail with reference to the accompanying drawings. The description of the embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noted that, the relative arrangements of the components and steps set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors have noticed that during the manufacturing process of a TFT-LCD liquid crystal panel, a bright spot defect i.e. a pixel which is a bright spot, often appears.

Accordingly, embodiments of the present disclosure provide the following technical solutions, which may repair the bright dot defect in the liquid crystal panel.

Figure 1B:
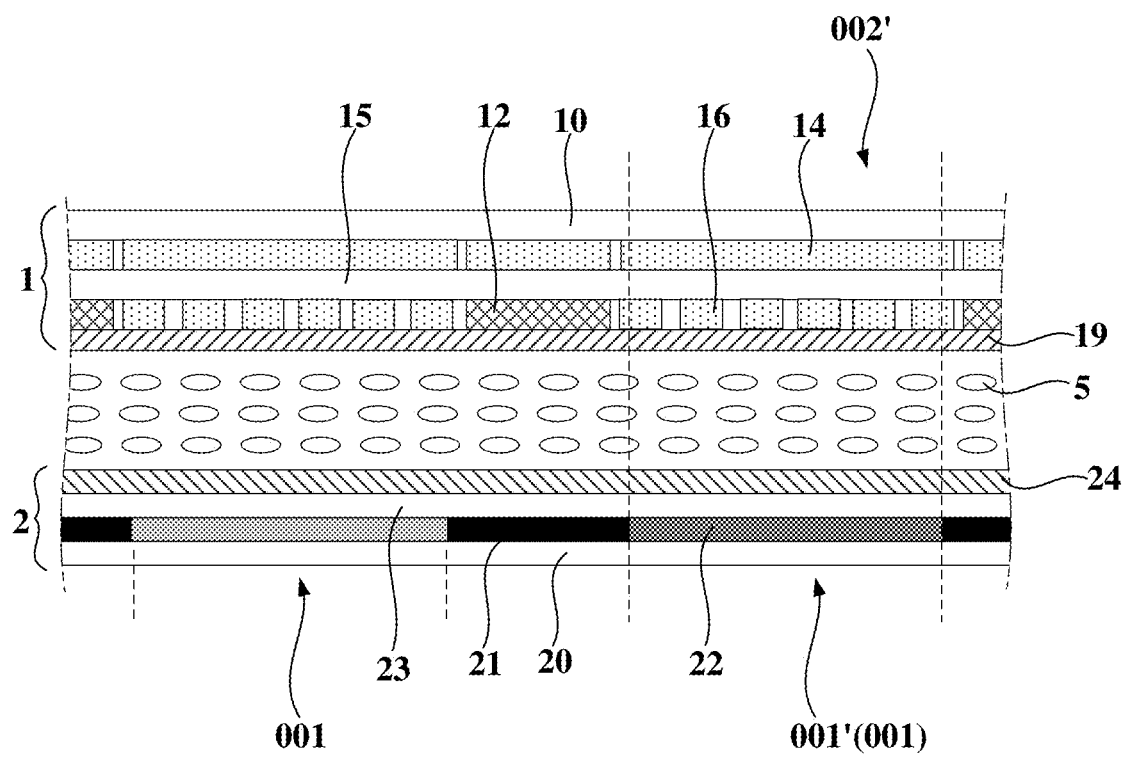
FIG. 1b is a schematic structural view showing partial cross section of a liquid crystal panel according to an embodiment of the present disclosure.

FIG. 1a is a schematic structural view showing partial top view of an array substrate of a liquid crystal panel according to an embodiment of the present disclosure. FIG. 1b is a schematic structural view showing partial cross section of a liquid crystal panel according to an embodiment of the present disclosure.

As shown in FIGS. 1a and 1b, the liquid crystal panel comprises an array substrate 1 and a filter substrate 2 spaced apart from each other, and a liquid crystal 5 located between the array substrate 1 and the filter substrate 2.

In the description of the present disclosure, a pixel 001 of the liquid crystal panel may be understood as a minimum physical liquid crystal unit of the liquid crystal panel, that is, a sub-pixel. For example, the pixel 001 may be a red sub-pixel, a green sub-pixel, or a blue sub-pixel. In order to realize the gray scale display of the liquid crystal panel, a pixel structure for controlling deflection of liquid crystal is disposed in the array substrate 1 correspondingly, and a filter layer 22, such as a red filter layer, a green filter layer, and a blue filter layer, is disposed in the filter substrate 2 correspondingly. The pixel structures in the array substrate 1 are defined by gate lines 12 and data lines 13 crossing with each other. Each pixel structure comprises a thin film transistor 11 and an electrode 16 or the like. The filter layer 22 in the filter substrate 2 is defined by a light shielding matrix 21. The size of the pixel 001 is defined by the light shielding matrix 21.

During normal operation of the liquid crystal panel, an opening portion of a pixel structure in the array substrate (that is, a portion that is not shielded by light shielding materials such as a thin film transistor, a gate line, or a data line) is transparent. Due to production defects or physical damages, a pixel which is a bright spot of the liquid crystal panel might appear. The pixel which is a bright spot will affect the display quality of the liquid crystal panel. When the liquid crystal panel displays a black screen, the pixel is particularly obvious and thus the impact on the display quality of the liquid crystal panel is particularly serious.

In the related art, repairing methods for repairing the pixel which is a bright dot comprise a light shielding matrix diffusion method and a filter layer carbonization method. These two methods both repair the pixel which is bright dot into a pixel which is a dark spot. Since the pixel which is a dark spot is not likely to be observed in macro-vision, the light shielding effect is achieved.

The principles of repairing the pixel which is a bright dot by the light shielding matrix diffusion method are as follows: the light shielding matrix adjacent to the filter layer corresponding to the pixel which is a bright dot in the filter substrate is granulated with laser, and then the granulated light shielding matrix diffuse to cover the filter layer, thereby achieving a light shielding effect. However, with the gradually increasing size of the liquid crystal panel and the gradually decreasing area ratio of the light shielding matrix, the coverage ratio of the granulated light shielding matrix over the filter layer after diffusion also gradually decreases. Thus, the success rate of repairing the liquid crystal panel shows a downward trend.

The principle of repairing the pixel which is a bright dot by the optical filter layer carbonization method are as follows: the filter layer corresponding to the pixel which is a bright dot in the filter substrate is carbonized with laser, thereby achieving a light shielding effect. However, with a small thickness and poor heat resistance, the filter layer is often excessively damaged and thus permeated by the liquid crystal. This will cause other defects, and eventually lead to failure in repairing the liquid crystal panel. In particularly, a metal element is usually doped in the filter layer and may have a driving effect on the liquid crystal permeating the filter layer, thereby significantly affecting the display quality of the liquid crystal panel.

It should be noted that, when the pixel which is a bright dot is repaired by the above two repairing methods, if the first repair fails, the success rate of the second repair is even lower, or even zero.

The embodiments of the present disclosure provide a repairing method of a liquid crystal panel, which may improve the success rate of repairing the pixel which is a bright dot and improve the production yield of the liquid crystal panel.

Figure 2:
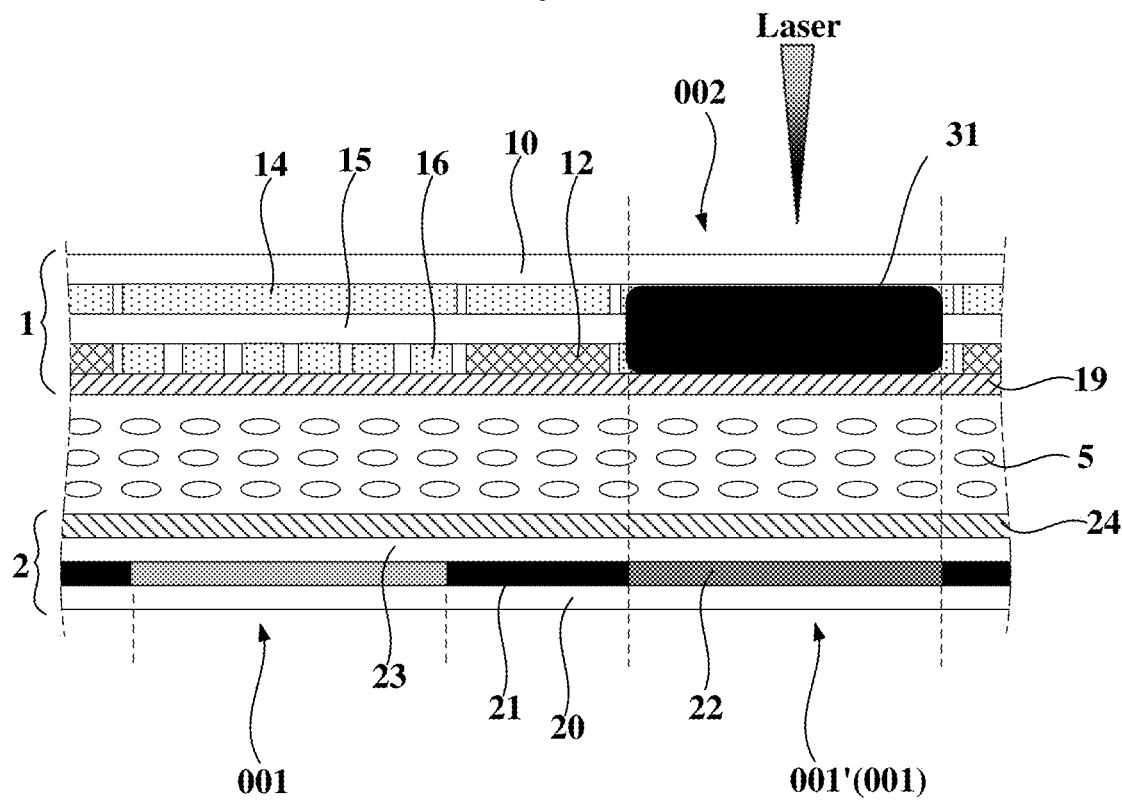
FIG. 2 is a schematic view showing repairing principles of a liquid crystal panel according to an embodiment of the present disclosure.

FIG. 2 is a schematic view showing repairing principles of a liquid crystal panel according to an embodiment of the present disclosure. As shown in FIG. 2, a pixel 001' which is a bright dot of the liquid crystal panel is irradiated with laser from one side of the array substrate 1 away from the filter substrate 2, so that a portion of the array substrate 1 located in the pixel 001' is converted from a light transmitting area 002' into a light shielding area 002.

It should be understood that, the orthographic projection of the pixel 001' which is a bright dot on the array substrate coincides with the portion of the array substrate located in the pixel 001' which is a bright dot.

In part of following description, for the sake of brevity, the pixel 001' which is a bright dot is simply referred to as the pixel 001'.

The physical and chemical properties of some layer(s) of the portion of the array substrate 1 located in the pixel 001' (i.e., the light transmitting area 002') may change after being irradiated with laser, so that the portion which is transparent becomes a light shielding portion, thereby achieving the purpose of repairing the pixel 001'.

In some embodiments, the liquid crystal panel is a liquid crystal panel with AD-SDS (Advanced Super Dimension Switch, referred to ADS) mode. The array substrate of the liquid crystal panel with ADS mode comprises a substrate, and a second transparent electrode, an inorganic insulating layer, and a first transparent electrode sequentially arranged along a direction from the substrate to the filter substrate. For example, the second transparent electrode is planar, and the first transparent electrode has a slit structure. In some embodiments, the first transparent electrode may be a common electrode, and the second transparent electrode may be a pixel electrode. In other embodiments, the first transparent electrode may be a pixel electrode, and the second transparent electrode may be a common electrode.

During operation of the liquid crystal panel with ADS mode, an electric field may be generated at the edge of the slit structure of the first transparent electrode, and an electric field may also be generated between the first transparent electrode and the second transparent electrode, thereby forming a multi-dimensional electric field to deflect the liquid crystal. The liquid crystal panel with ADS mode has characteristics such as high resolution, high transmittance, low power consumption, wide viewing angle, high aperture ratio, low chromatic aberration, and no water ripples after being squeezed.

The array substrate shown in FIG. 1a, and the liquid crystal panel shown in FIGS. 1b and 2 show partial structure of the liquid crystal panel with ADS mode in some embodiments. The array substrate 1 mainly comprises a first substrate 10 (e.g., a glass substrate), a thin film transistor 11, a gate line 12, a data line 13, a common electrode 14, an inorganic insulating layer 15, a pixel electrode 16, a common electrode line 17, a common electrode compensation structure 18 and an alignment layer 19 (also referred to as a first alignment layer 19) and the like. The inorganic insulating layer 15 is located between the common electrode 14 and the pixel electrode 16. Each pixel structure comprises a thin film transistor 11, a pixel electrode 16, and a common electrode 14. A gate 112 of the thin film transistor 11 is connected to the gate line 12, a source 111 of the thin film transistor 11 is connected to the data line 13, and a drain 110 of the thin film transistor 11 is connected to the pixel electrode 16. The common electrode is planar, connected to the common electrode compensation structure 18 in the column direction and connected to the common electrode line 17 in the row direction. The pixel electrode 16 has a slit structure, and the pixel electrode 16 and the common electrode 14 are spaced apart by the inorganic insulating layer 15. The alignment layer 19 in the array substrate 1 is closest to the liquid crystal 5. One of the data line 13 and the gate line 12 extends along a first direction, and the other extends along a second direction different from the first direction. For example, the first direction is perpendicular to the second direction.

The filter substrate 2 mainly comprises a second substrate 20 (e.g., a glass substrate), a light shielding matrix 21, a filter layer 22, a protective layer 23, and an alignment layer 24 (also referred to as a second alignment layer 24). Adjacent filter layers 22 are spaced apart by the light shielding matrix 21, and the alignment layer 24 in the filter substrate 2 is closest to the liquid crystal 5.

As shown in FIG. 2, for the liquid crystal panel with ADS mode, when the pixel 001' is repaired, laser is incident from one side of the array substrate 1 away from the filter substrate 2, and the pixel electrode 16, the inorganic insulating layer 15 and the common electrode 14 in the portion of the array substrate located in the pixel 001' are irradiated to form a heterogeneous mixture 31 which is light shielding. For example, the materials of the pixel electrode 16 and the common electrode 14 comprise a transparent conductive material such as indium tin oxide or indium zinc oxide (the pixel electrode and the common electrode are also usually referred to as transparent electrodes), and the material of the inorganic insulating layer 15 comprises a material such as silicon nitride. In this case, the pixel electrode 16, the inorganic insulating layer 15 and the common electrode 14 are irradiated to form a heterogeneous mixture 31 of metal and non-metal. The heterogeneous mixture 31 has a black color and a light shielding property, thereby achieving the purpose of repairing the pixel 001'.

In other embodiments, in the array substrate of the liquid crystal panel with ADS mode, the pixel electrode is closer to the substrate 10 than the common electrode, and the common electrode has a slit structure. The pixel electrode and the common electrode are spaced apart by the inorganic insulating layer. In this case, when the pixel which is a bright spot of the liquid crystal panel is repaired by the repairing method of the embodiments of the present disclosure, the pixel electrode, the inorganic insulating layer, and the common electrode are irradiated to form a light shielding heterogeneous mixture.

It should be noted that the repairing method of the embodiments of the present disclosure is also applicable to liquid crystal panels with modes such as TN (Twisted Nematic) mode, VA (Vertical Alignment) mode or IPS (In-Plane-Switching) mode. In this case, the array substrate 1 of the liquid crystal panel comprises a first substrate 10 and a pixel electrode (also referred to as a first transparent electrode 16) located on one side of the first substrate 10 close to the filter substrate 2, and the filter substrate 2 of the liquid crystal panel comprises a common electrode. For example, the common electrode may be located between the alignment layer 24 and the protective layer 23. When the liquid crystal panel is repaired, laser is incident from one side of the array substrate 1 away from the filter substrate 2 and a portion of the first transparent electrode 16 located in the pixel 001' is irradiated to form a light shielding area. That is, the first transparent electrode 16 is no longer transparent. For example, in a case where the material of the first transparent electrode 16 is indium tin oxide, tetravalent indium becomes divalent or trivalent indium after the indium tin oxide is irradiated with laser, so that the first transparent electrode 16 is no longer transparent.

In addition, the repairing method of the embodiments of the present disclosure may also be applied to a liquid crystal panel which has been repaired by at least one of the light shielding matrix diffusion method or the filter layer carbonization method fails. In other words, before the liquid crystal panel is repaired by the repairing method of the embodiments of the present disclosure, the liquid crystal panel is repaired by at least one of the light shielding matrix diffusion method or the filter layer carbonization method. In this way, after secondary repair is performed on the liquid crystal panel, a portion of the array substrate located in the pixel which is a bright spot is converted from a light transmitting area to a light shielding area, thereby achieving the purpose of repairing the pixel which is a bright spot of the liquid crystal panel.

Compared with the related art, the repairing method of a liquid crystal panel provided by the embodiments of the present disclosure has at least one of the following advantageous effects.

(1) The damage to the filter layer caused by laser is effectively reduced or even avoided, thereby effectively preventing other defects caused by the liquid crystal permeating the filter layer.

(2) The repairing effect is not limited by the size of the liquid crystal panel, the area ratio of the light shielding matrix, or the material characteristics and thickness of the filter layer, and a high success rate of repair, which may, for example, more than 98% is achieved. The repairing method can be applied to a wide range of application and is particularly suitable for large-size liquid crystal panels.

(3) A secondary repair on the liquid crystal panel which has been repaired by at least one of the light shielding matrix diffusion method or the filter layer carbonization method may be performed, thereby saving the manufacturing cost to a larger extent.

(4) Parameters of laser are easy to set and need not to be set differently for different colors of filter layers. Thus, a high repair efficiency is achieved.

Figure 3:
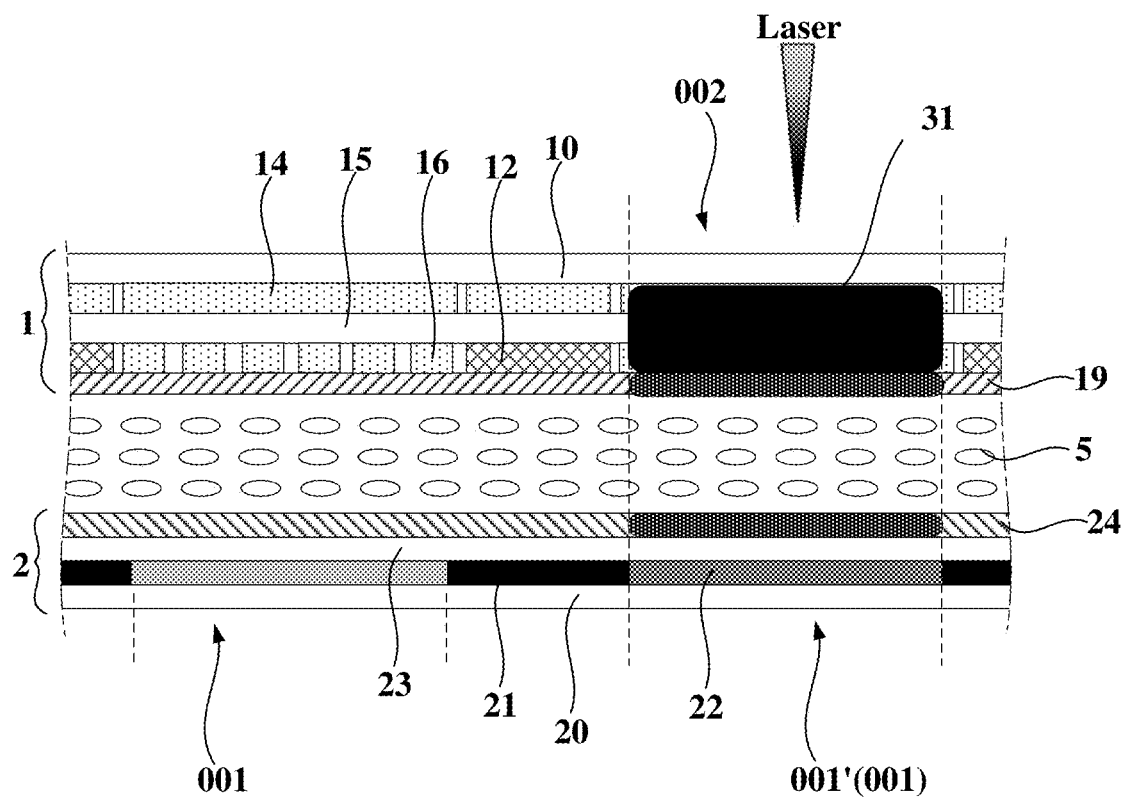
FIG. 3 is a schematic view showing repairing principles of a liquid crystal panel according to another embodiment of the present disclosure.

FIG. 3 is a schematic view showing repairing principles of a liquid crystal panel according to another embodiment of the present disclosure. As shown in FIG. 3, in other embodiments of the present disclosure, when the pixel 001' is repaired, laser is incident from one side of the array substrate 1 away from the filter substrate 2. In a case where a portion of each of the common electrode 14, the pixel electrode 16, and the inorganic insulating layer 15 in the array substrate 1, which is located in the pixel 001', is irradiated by the laser, a portion of the alignment layer 19 in the array substrate 1, which is located in the pixel 001', is also irradiated and carbonized by the laser. In some embodiments, a portion of the alignment layer 24 in the filter substrate 2, which is located in the pixel 001', is also irradiated and carbonized by the laser.

For example, the materials of the alignment layer 19 and the alignment layer 24 may comprise polyimide. The alignment layer 19 and the alignment layer 24 may be carbonized and blackened after being irradiated by laser, and exhibit a light shielding property. For the pixel 001' of the liquid crystal panel, by controlling the irradiation depth of the laser, one or more layers of a portion of the array substrate 1 located in the pixel 001' may be irradiated to from a light shielding substance, such as a heterogeneous mixture 31. At the same time, the portion of the alignment layer 19 of the array substrate 1 located in the pixel 001' and the portion of the alignment layer 24 of the filter substrate 2 located in the pixel 001' may be irradiated and carbonized. In this manner, the light shielding property of the pixel 001' after repair will be enhanced, and the success rate of repair of the liquid crystal panel will be further improved.

Figure 4:
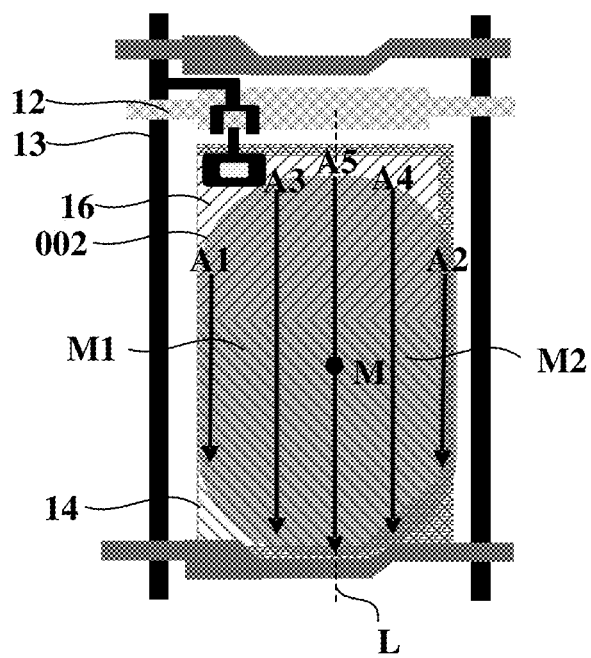
FIG. 4 is a schematic view showing that a pixel which is a bright spot is irradiated with laser according to an embodiment of the present disclosure.

FIG. 4 is a schematic view showing that a pixel which is a bright spot is irradiated with laser according to an embodiment of the present disclosure.

Some implementations of irradiating the pixel which is a bright spot of the liquid crystal panel will be introduced below in conjunction with FIG. 4.

In some implementations, the pixel which is a bright spot is irradiated for a plurality of times with laser along a first direction. Here, the pixel which is a bright spot is irradiated for different times starting from different edge areas of the pixel which is a bright spot. In other words, the pixel which is a bright spot is irradiated for one of any two of the plurality of times starting from an edge area of the pixel which is a bright spot, and the pixel which is a bright spot is irradiated for the other of the any two of the plurality of times starting from another edge area of the pixel which is a bright spot. It should be understood that an edge area of the pixel which is a bright spot may be understood as an area of the pixel which is a bright spot close to the edge of the pixel. It should also be understood that the first direction which may be any direction, for example, may be a direction along which one of the data line 13 and the gate line 12 extends. The first direction shown in FIG. 4 is a direction along which the data line 13 extends.

As shown in FIG. 4, A1-A5 indicate five times of irradiating. Each time of irradiating may start from a certain area close to the edge of the pixel which is a bright spot, and different times of irradiating start from different areas. For example, taking the A1 time of irradiating as an example, after a certain edge area is determined as a starting point of the A1 time of irradiating, the laser moves along the first direction, and ceases when moving to another edge area, thereby completing the A1 time of irradiating. Another edge area is determined as the starting point of another time of irradiating and this another time of irradiating may be completed in a similar manner as above, which will not be described in detail here.

Considering that the heat generated by irradiating the pixel which is a bright spot might affect the pixels around the pixel which is a bright spot, in order to reduce the heat accumulation and alleviate the adverse effects on the pixels around the pixel which is a bright spot, the embodiments of the present disclosure provide the following solutions.

As shown in FIG. 4, the pixel which is a bright dot is divided into a first area M1 and a second area M2 by a line L passing through the geometric center M of the pixel which is a bright dot and parallel to the first direction. It should be understood that the geometric center M may be understood as the geometric center of the orthographic projection of the pixel which is a bright spot on the first substrate 10.

The plurality of times of irradiating for the pixel which is a bright spot may comprise a first plurality of times of irradiating for the first area M1 and a second plurality of times of irradiating for the second area for M2. Here, at least one of the first plurality of times or the second plurality of times is irradiated according to a sequence from being away from the line L to being close to the line L.

For example, the first plurality of times of irradiating for the first area M1 comprises the A1 time of irradiating and the time of A3 irradiating, and the time of A3 irradiating is closer to the line L than the time of A1 irradiating. For example, the second plurality of times of irradiating for the second area M2 comprises the A2 time of irradiating and the A4 time of irradiating, and the A4 time of irradiating is closer to the line L than the A2 time of irradiating. In some implementations, the A1 time of irradiating precedes the A3 time of irradiating. In other implementations, the A2 time of irradiating precedes the A4 time of irradiating. In further implementations, the A1 time of irradiating precedes the A3 time of irradiating, and the A2 time of irradiating precedes the A4 time of irradiating. In addition, the A5 time of irradiating may be understood as irradiating the pixel which is a bright spot along the line L. Therefore, the A1 time of irradiating, the A2 time of irradiating, the A3 time of irradiating, and the A4 time of irradiating all precede the A5 time of irradiating.

In some implementations, the A1 time of irradiating and the A2 time of irradiating both precede the A3 time of irradiating and the A4 time of irradiating. For example, the pixel which is a bright spot is irradiated according to a sequential order of the A1 time of irradiating, the A2 time of irradiating, the A3 time of irradiating, the A4 time of irradiating, and the A5 time of irradiating.

It may be understood that the times of irradiating required for different specifications of liquid crystal panels with different pixel sizes may vary. For the irradiating depth of the laser and the changes in the physicochemical properties of the structure, references can be made to the description of the above embodiments.

In order to precisely control the irradiating effect of the laser and avoid the laser from affecting other layers, the laser used in some embodiments of the present disclosure may have a wavelength of 1030 to 1064 nm, a frequency of 125 to 165 kHz, a scanning speed of 265 to 335 microns/second, and an optical spot with a long diameter of 4 to 10 microns and a short diameter of 2.5 to 6 microns. For example, the device that emits the laser may have a resolution reaching a femtosecond ($1\times10^{-15}$ second) level, that is, may be a femtosecond laser device.

In order to verify the repair effect of the pixel which is a bright spot of the liquid crystal panel, the inventors have conducted a large number of tests. Some typical test examples will be introduced below.

Test Example 1: the pixel which is a bright spot of the 65-inch liquid crystal panel with ADS mode is repaired by the repairing method shown in FIG. 3. Ten red pixels, ten green pixels and ten blue pixels, each of which is a bright spot, are repaired as samples.

The laser used has a wavelength of 1030 nm, a frequency of 125 kHz, a scanning speed of 280 μm/s, and an optical spot with a long diameter of 4 μm and a short diameter of 2.5 μm. The A1 time of irradiating, the A2 time of irradiating, the A3 time of irradiating, the A4 time of irradiating, and the A5 time of irradiating with reference to FIG. 4 are performed sequentially.

After the pixels each of which is a bright spot of the liquid crystal panel are repaired, in order to verify the repair effect, the array substrate and the filter substrate are peeled off and microscopically observed respectively.

Figure 5A:
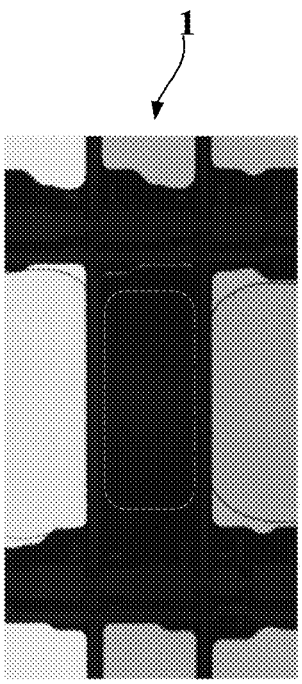
FIG. 5a is a micrograph showing partial top view of an array substrate after repairing by a repairing method according to an embodiment of the present disclosure.
Figure 5B:
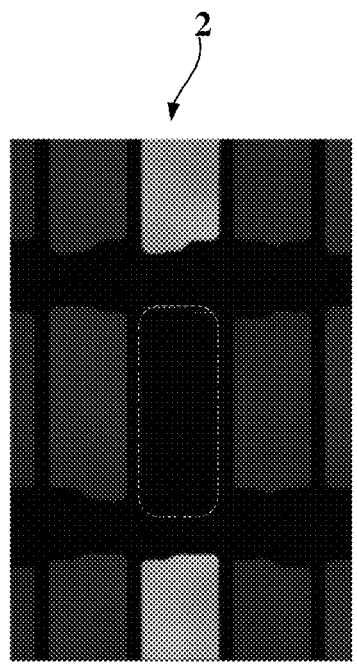
FIG. 5b is a micrograph showing partial top view of a filter substrate after repairing by a repairing method according to an embodiment of the present disclosure.
Figure 5C:
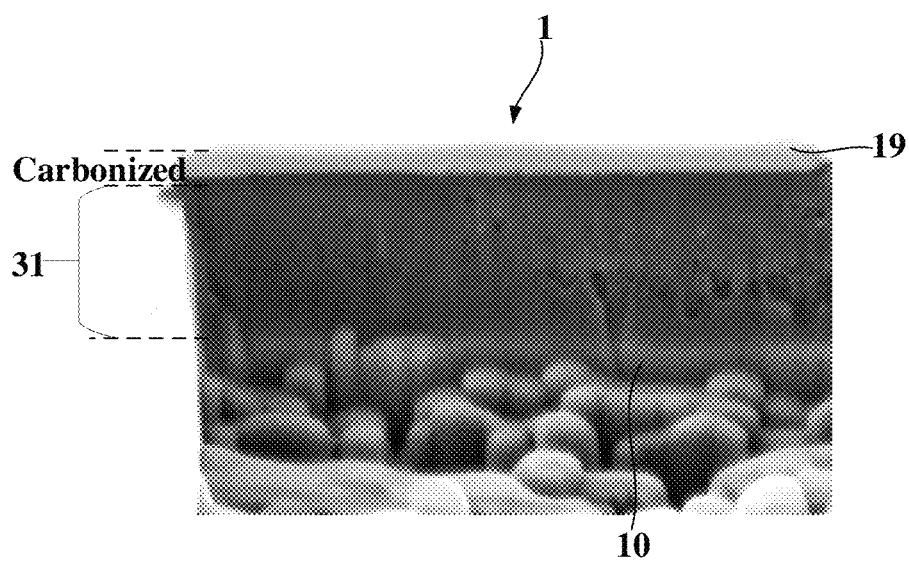
FIG. 5c is a micrograph showing partial top view of an array substrate after repairing by a repairing method according to another embodiment of the present disclosure.
Figure 5D:
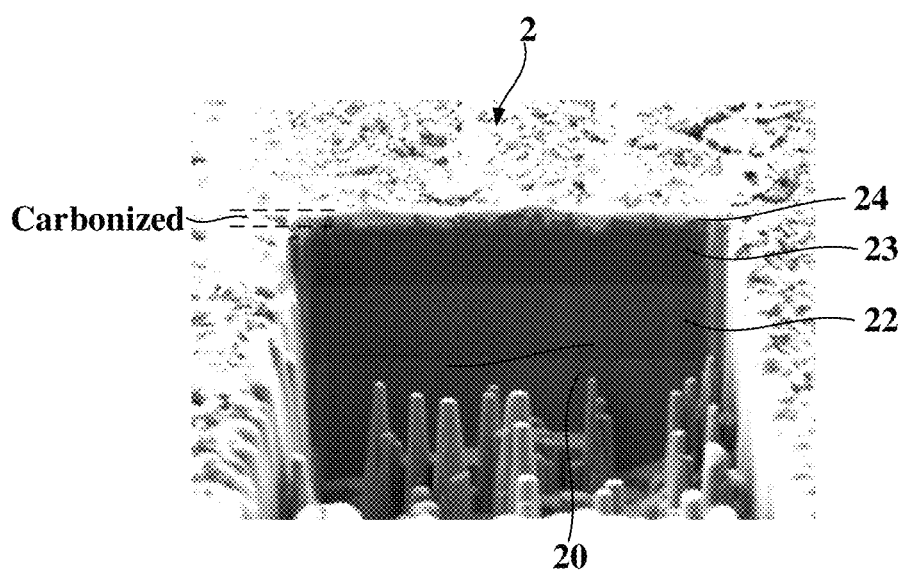
FIG. 5d is a micrograph showing partial top view of a filter substrate after repairing by a repairing method according to another embodiment of the present disclosure.

The top view microstructure at the repair position of the array substrate is shown in FIG. 5a, the top view microstructure at the repair position of the filter substrate is shown in FIG. 5b, and the sectional microstructure at the repair position of the array substrate is shown in FIG. 5c, and the sectional microstructure at the repair position of the filter substrate is shown in FIG. 5d.

As shown in FIGS. 5a and 5b, the portion of the array substrate 1 and the portion of the filter substrate 2 (shown as dotted lines in FIGS. 5a and 5b) located in the pixel which is a bright spot both exhibit a light shielding property, thereby achieving the purpose of repairing the pixel which is a bright spot.

As shown in FIGS. 5c and 5d, after being irradiated with laser, the portion of each of the pixel electrode, the inorganic insulating layer, and the common electrode of the array substrate 1 located in the pixel which is a bright spot forms a light shielding heterogeneous mixture 31. At the same time, the portion of the alignment layer 19 of the array substrate 1 located in the pixel which is a bright spot and the portion of the alignment layer 24 of the filter substrate 2 located in the pixel which is a bright spot are carbonized.

In the Test Example 1, a total of 30 sample pixels, each of which is a bright spot, including red pixels, green pixels, and blue pixels are all successfully repaired, with a success rate of repair of 100%.

Test Example 2: the pixel which is a bright spot of the 75-inch liquid crystal panel with ADS mode is repaired by the repairing method shown in FIG. 3. Specifically, twenty red pixels, twenty green pixels and twenty blue pixels, each of which is a bright spot, are repaired as samples.

The laser used has a wavelength of 1030 nanometers, a frequency of 150 kHz, a scanning speed of 300 microns/second, and an optical spot with a long diameter of 6 microns and a short diameter of 4 microns. The A1 time of irradiating, the A2 time of irradiating, the A3 time of irradiating, the A4 time of irradiating, and the A5 time of irradiating with reference to FIG. 4 are performed sequentially.

In the Test Example 2, a total of 60 sample pixels, each of which is a bright spot, including red pixels, green pixels, and blue pixels are repaired, with a success rate of repair of 98.3%.

Test Example 3: the pixel which is a bright spot of the 65-inch liquid crystal panel with ADS mode is repaired by the repairing method shown in FIG. 3. Specifically, twenty-five red pixels, twenty-five green pixels and twenty-five blue pixels, each of which is a bright spot, are repaired as samples.

The laser used has a wavelength of 1030 nanometers, a frequency of 165 kHz, a scanning speed of 300 microns/second, an optical spot with a long diameter of 4 microns and a short diameter of 2.5 microns. The A1 time of irradiating, the A2 time of irradiating, the A3 time of irradiating, the A4 time of irradiating, and the A5 time of irradiating with reference to FIG. 4 are performed sequentially.

In the Test Example 3, a total of 75 sample pixels, each of which is a bright spot, including red pixels, green pixels, and blue pixels are repaired, with a success rate of repair of 98.7%.

Test Example 4: the pixel which is a bright spot of the 65-inch liquid crystal panel with ADS mode is repaired by the repairing method shown in FIG. 3. Specifically, thirty red pixels, thirty green pixels and thirty blue pixels, each of which is a bright spot, are repaired as samples.

The laser used has a wavelength of 1030 nanometers, a frequency of 130 kHz, a scanning speed of 295 microns/second, an optical spot with a long diameter of 5 microns and a short diameter of 4 microns. The A1 time of irradiating, the A2 time of irradiating, the A3 time of irradiating, the A4 time of irradiating, and the A5 time of irradiating with reference to FIG. 4 are performed sequentially.

In the Test Example 4, a total of 75 sample pixels, each of which is a bright spot, including red pixels, green pixels, and blue pixels are repaired, with a success rate of repair of 98.9%.

Test Example 5: the pixel which is a bright spot of the 65-inch liquid crystal panel with ADS mode is repaired for the second time by the repairing method shown in FIG. 3. Specifically, thirty red pixels, thirty green pixels and thirty blue pixels, each of which is a bright spot, are repaired as samples.

The laser used has a wavelength of 1030 nanometers, a frequency of 130 kHz, a scanning speed of 295 microns/second, an optical spot with a long diameter of 5 microns and a short diameter of 4 microns. The A1 time of irradiating, the A2 time of irradiating, the A3 time of irradiating, the A4 time of irradiating, and the A5 time of irradiating with reference to FIG. 4 are performed sequentially.

In the Test Example 5, a total of 90 sample pixels, each of which is a bright spot, including red pixels, green pixels, and blue pixels are repaired, with a success rate of repair of 98.3%.

In summary, with the repairing method of a liquid crystal panel of the embodiments of the present disclosure, the success rate and efficiency of repairing the pixel which is a bright spot of a liquid crystal panel can be significantly improved, and the production yield of the liquid crystal panel may be enhanced.

The embodiments of the present disclosure further provide a liquid crystal panel, which is obtained after repair according to any of the foregoing repairing methods.

The structure of a liquid crystal panel according to some embodiments of the present disclosure will be described below in conjunction with FIG. 3.

As shown in FIG. 3, the liquid crystal panel comprises an array substrate 1 and a filter substrate 2. A liquid crystal 5 is disposed between the array substrate 1 and the filter substrate 2. The portion of the array substrate 1 located in at least one pixel (e.g., a pixel 001) of the liquid crystal panel is a light shielding area, that is, opaque. It should be understood that the pixel 001 here is obtained by repairing the pixel 001' which is a bright spot.

In some embodiments, referring to FIG. 3, the array substrate 2 comprises a first substrate 10 and a first transparent electrode 16 located on one side of the first substrate 10 close to the filter substrate 2. In this case, the light shielding area in the liquid crystal panel is obtained by irradiating a portion of the first transparent electrode 16 located in the pixel 001 with laser.

In other embodiments, referring to FIG. 3, the array substrate 11 further comprises a second transparent electrode 14 located between the first transparent electrode 16 and the first substrate 10, and an inorganic insulating layer 15 between the first transparent electrode 16 and the second transparent electrode 14. In this case, the light shielding area formed comprises a heterogeneous mixture 31 that is opaque. Here, the heterogeneous mixture 31 is obtained by irradiating a portion of the first transparent electrode 16 located in the pixel 001, a portion of the inorganic insulating layer 15 located in the pixel 001, and a portion of the second transparent electrode 14 located in the pixel 001 with laser.

In further embodiments, referring to FIG. 3, the array substrate 11 further comprises a first alignment layer 19 on one side of the first transparent electrode 16 away from the first substrate 10. A portion of the first alignment layer 19 located in the pixel 001' is carbonized.

In some embodiments, referring to FIG. 3, the filter substrate 2 comprises a second alignment layer 24. A portion of the second alignment layer 24 located in the pixel 001' is carbonized.

The present disclosure also provides a liquid crystal device comprising the liquid crystal panel of any one of the above embodiments. In some embodiments, the liquid crystal device may be any product or member having a liquid crystal function, such as a mobile terminal, a television, a liquid crystal, a notebook computer, a digital photo frame, a navigator, or an electronic paper.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A repairing method of a liquid crystal panel, wherein the liquid crystal panel comprises an array substrate and a filter substrate, and the repairing method comprises:
    irradiating a pixel which is a bright spot of the liquid crystal panel with laser from one side of the array substrate away from the filter substrate, so that a portion of the array substrate located in the pixel is converted from a light transmitting area into a light shielding area,
    wherein the laser has a wavelength of 1030 to 1064 nanometers, a frequency of 125 to 165 KHz, a scanning speed of 265 to 335 microns/second, and an optical spot with a long diameter of 4 to 10 microns and a short diameter of 2.5 to 6 microns.

2. The repairing method according to claim 1, wherein the array substrate comprises a first substrate and a first transparent electrode located on one side of the first substrate close to the filter substrate; and
    the irradiating comprises:
    irradiating a portion of the first transparent electrode located in the pixel with the laser to obtain the light shielding area.

3. The repairing method according to claim 2, wherein the array substrate further comprises a second transparent electrode located between the first transparent electrode and the first substrate, and an inorganic insulating layer located between the first transparent electrode and the second transparent electrode; and
    the irradiating comprises:
    irradiating the portion of the first transparent electrode located in the pixel, a portion of the inorganic insulating layer located in the pixel and a portion of the second transparent electrode located in the pixel with the laser to obtain the light shielding area comprising a heterogeneous mixture.

4. The repairing method according to claim 2, wherein the array substrate further comprises a first alignment layer located on one side of the first transparent electrode away from the first substrate; and
    the irradiating further comprises:
    irradiating a portion of the first alignment layer located in the pixel with the laser to carbonize the portion of the first alignment layer.

5. The repairing method according to claim 4, wherein the filter substrate comprises a second alignment layer; and
    the irradiating further comprises:
    irradiating a portion of the second alignment layer located in the pixel with the laser to carbonize the portion of the second alignment layer.

6. The repairing method according to claim 1, wherein the irradiating comprises:
    irradiating the pixel for a plurality of times with the laser along a first direction, wherein the pixel is irradiated for one of any two of the plurality of times starting from an edge area of the pixel, and the pixel is irradiated for the other of the any two of the plurality of times starting from another edge area of the pixel.

7. The repairing method according to claim 6, wherein the pixel is divided into a first area and a second area by a line passing through a geometric center of the pixel and parallel to the first direction; and
    the plurality of times comprises a first plurality of times for irradiating the first area and a second plurality of times for irradiating the second area, wherein at least one of the first plurality of times or the second plurality of times is irradiated according to a sequence from being away from the line to being close to the line.

8. The repairing method according to claim 6, wherein the array substrate comprises a data line and a gate line, and one of the data line and the gate line extends along the first direction and the other extends along a second direction different from the first direction.

9. The repairing method according to claim 3, wherein the first transparent electrode is a pixel electrode, and the second transparent electrode is a common electrode.

10. The repairing method according to claim 1, wherein the laser has the wavelength of 1030 nanometers, the frequency of 125 kHz, the scanning speed of 280 microns/second, and the optical spot with the long diameter of 4 microns and the short diameter of 2.5 microns.

11. The repairing method according to claim 1, wherein the laser has the wavelength of 1030 nanometers, the frequency of 150 kHz, the scanning speed of 300 microns/second, and the optical spot with the long diameter of 6 microns and the short diameter of 4 microns.

12. The repairing method according to claim 1, wherein the laser has the wavelength of 1030 nanometers, the frequency of 165 kHz, the scanning speed of 300 microns/second, and the optical spot with the long diameter of 4 microns and the short diameter of 2.5 microns.

13. The repairing method according to claim 1, wherein the laser has the wavelength of 1030 nanometers, the frequency of 130 kHz, the scanning speed of 295 microns/second, and the optical spot with the long diameter of 5 microns and the short diameter of 4 microns.

* * * * *